United States Patent
Tzannes et al.

(10) Patent No.: US 8,031,619 B2
(45) Date of Patent: *Oct. 4, 2011

(54) SPLITTERLESS MULTICARRIER MODEM

(75) Inventors: Marcos C. Tzannes, Orinda, CA (US); Richard W. Gross, Acton, MA (US); John A. Greszczuk, Stow, MA (US); David M. Krinsky, Acton, MA (US); Michael A. Tzannes, Lexington, MA (US)

(73) Assignee: Daphimo Co., B.V., LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/555,642

(22) Filed: Sep. 8, 2009

(65) Prior Publication Data

US 2009/0323788 A1    Dec. 31, 2009

Related U.S. Application Data

(60) Continuation of application No. 11/769,420, filed on Jun. 27, 2007, now abandoned, which is a continuation of application No. 10/635,449, filed on Aug. 7, 2003, now abandoned, which is a division of application No. 10/189,212, filed on Jul. 5, 2002, now abandoned, which is a division of application No. 09/573,816, filed on May 17, 2000, now Pat. No. 6,549,520, which is a continuation of application No. 09/485,614, filed as application No. PCT/US98/21442 on Oct. 9, 1998, now Pat. No. 6,266,348.

(60) Provisional application No. 60/072,450, filed on Jan. 26, 1998, provisional application No. 60/072,986, filed on Jan. 21, 1998, provisional application No. 60/071,701, filed on Jan. 16, 1998, provisional application No. 60/061,689, filed on Oct. 10, 1997.

(51) Int. Cl.
*H04L 12/26* (2006.01)
*H04J 1/16* (2006.01)
*G06F 11/00* (2006.01)

(52) U.S. Cl. ........... 370/241; 370/255; 375/222; 714/48

(58) Field of Classification Search .................. 370/201, 370/241, 254, 255, 278, 281; 375/222; 714/48
See application file for complete search history.

(56) References Cited

U.S. PATENT DOCUMENTS 3,573,380 A    4/1971    Darlington
(Continued)

FOREIGN PATENT DOCUMENTS

EP    0473465 A1    3/1992
(Continued)

OTHER PUBLICATIONS

Atungsiri et al. (Jun. 1997), "Multirate coding for Mobile Communications Link Adaption," IEE Proc. Commun., 144 (3):211-216.
(Continued)

*Primary Examiner* — Chi Pham
*Assistant Examiner* — Ahmed Elallam
(74) *Attorney, Agent, or Firm* — Schwabe, Williamson & Wyatt, P.C.

(57) ABSTRACT

A modem for use in Digital Subscriber Line communications transmits and receives data over the local subscriber loop in common with voice information over the loop, while avoiding the need for voice/data splitters. The modem responds to disruptions associated with "disturbance events" such as on-hook to off-hook transitions and the like by rapidly switching between pre-stored channel parameter control sets defining communications over the loop under varying conditions. In addition to changing parameter control sets responsive to a disturbance event, the modem may also change transmission power levels and other system parameters such as frequency domain equalizer characteristics. Further, provisions are made for reduced bandwidth communications under selected conditions.

7 Claims, 7 Drawing Sheets

U.S. PATENT DOCUMENTS

| | | | |
|---|---|---|---|
| 4,131,766 A | 12/1978 | Narasimha |
| 4,568,156 A | 2/1986 | Dane |
| 4,679,227 A | 7/1987 | Hughes-Hartogs |
| 4,731,816 A | 3/1988 | Hughes-Hartogs |
| 4,802,190 A | 1/1989 | Schouhamer Immink |
| 4,912,763 A | 3/1990 | Galand et al. |
| 5,048,054 A | 9/1991 | Eyuboglu et al. |
| 5,128,964 A | 7/1992 | Mallory |
| 5,206,886 A | 4/1993 | Bingham |
| 5,285,474 A | 2/1994 | Chow et al. |
| 5,327,574 A | 7/1994 | Monma et al. |
| 5,400,322 A | 3/1995 | Hunt et al. |
| 5,428,790 A | 6/1995 | Harper et al. |
| 5,452,288 A | 9/1995 | Rahuel et al. |
| 5,479,447 A | 12/1995 | Chow et al. |
| 5,495,483 A | 2/1996 | Grube et al. |
| 5,497,398 A | 3/1996 | Tzannes et al. |
| 5,519,731 A | 5/1996 | Cioffi |
| 5,521,906 A | 5/1996 | Grube et al. |
| 5,533,008 A | 7/1996 | Grube et al. |
| 5,555,244 A | 9/1996 | Gupta et al. |
| 5,592,477 A | 1/1997 | Farris et al. |
| 5,596,604 A | 1/1997 | Cioffi et al. |
| 5,598,435 A | 1/1997 | Williams |
| 5,625,651 A | 4/1997 | Cioffi |
| 5,636,246 A | 6/1997 | Tzannes et al. |
| 5,644,573 A | 7/1997 | Bingham et al. |
| 5,673,290 A | 9/1997 | Cioffi |
| 5,731,706 A | 3/1998 | Koeman et al. |
| 5,737,337 A | 4/1998 | Voith et al. |
| 5,790,523 A * | 8/1998 | Ritchie et al. ............ 370/241 |
| 5,805,669 A | 9/1998 | Bingel et al. |
| 5,812,599 A | 9/1998 | Van Kerckhove |
| 5,822,372 A | 10/1998 | Emami |
| 5,822,374 A | 10/1998 | Levin |
| 5,832,032 A | 11/1998 | Overbury |
| 5,832,387 A | 11/1998 | Bae et al. |
| 5,838,667 A | 11/1998 | Bingham et al. |
| 5,852,633 A | 12/1998 | Levin et al. |
| 5,903,608 A | 5/1999 | Chun |
| 5,909,463 A | 6/1999 | Johnson et al. |
| 5,933,454 A | 8/1999 | Cioffi |
| 5,960,036 A | 9/1999 | Johnson et al. |
| 5,982,784 A | 11/1999 | Bell |
| 5,995,566 A | 11/1999 | Rickard et al. |
| 6,005,893 A | 12/1999 | Hyll |
| 6,014,425 A | 1/2000 | Bingel et al. |
| 6,028,486 A | 2/2000 | Andre |
| 6,035,000 A | 3/2000 | Bingham |
| 6,052,411 A | 4/2000 | Mueller et al. |
| 6,055,297 A | 4/2000 | Terry |
| 6,061,392 A | 5/2000 | Bremer et al. |
| 6,065,060 A | 5/2000 | Liu et al. |
| 6,072,779 A | 6/2000 | Tzannes et al. |
| 6,073,179 A | 6/2000 | Liu et al. |
| 6,092,122 A | 7/2000 | Liu et al. |
| 6,101,216 A | 8/2000 | Henderson et al. |
| 6,128,335 A | 10/2000 | Liu et al. |
| 6,128,348 A | 10/2000 | Kao et al. |
| 6,130,882 A | 10/2000 | Levin |
| 6,137,840 A | 10/2000 | Tiedemann, Jr. et al. |
| 6,144,696 A | 11/2000 | Shively et al. |
| 6,161,023 A | 12/2000 | Johnson et al. |
| 6,161,203 A | 12/2000 | Zuranski et al. |
| 6,219,378 B1 | 4/2001 | Wu |
| 6,229,855 B1 | 5/2001 | Takatori et al. |
| 6,252,900 B1 | 6/2001 | Liu et al. |
| 6,266,348 B1 | 7/2001 | Gross et al. |
| 6,272,108 B1 | 8/2001 | Chapman |
| 6,301,337 B1 | 10/2001 | Scholtz et al. |
| 6,314,102 B1 | 11/2001 | Czerwiec et al. |
| 6,317,493 B1 | 11/2001 | Little et al. |
| 6,370,156 B2 | 4/2002 | Spruyt et al. |
| 6,400,759 B1 | 6/2002 | Liu et al. |
| 6,445,733 B1 | 9/2002 | Zuranski et al. |
| 6,549,520 B1 | 4/2003 | Gross et al. |
| 6,574,239 B1 | 6/2003 | Dowling et al. |
| 7,130,338 B2 | 10/2006 | Bremer et al. |

FOREIGN PATENT DOCUMENTS

| | | |
|---|---|---|
| EP | 0652677 A2 | 5/1995 |
| EP | 0703685 A2 | 3/1996 |
| EP | 0753947 A1 | 1/1997 |
| EP | 0762701 A2 | 3/1997 |
| EP | 0812087 A2 | 12/1997 |
| EP | 0820168 A2 | 1/1998 |
| EP | 0905948 A2 | 3/1999 |
| EP | 0840474 A2 | 1/2010 |
| JP | 60-112357 A | 6/1985 |
| JP | 62-502932 A | 11/1987 |
| JP | 04-022235 A | 1/1992 |
| JP | 07-336274 A | 12/1995 |
| JP | 09-51328 A | 2/1997 |
| JP | 11-168515 A | 6/1999 |
| JP | 00-514991 A | 11/2000 |
| WO | 86/07223 A1 | 12/1986 |
| WO | 97/15131 A2 | 4/1997 |
| WO | 98/10556 A2 | 3/1998 |
| WO | 98/27665 A | 6/1998 |
| WO | 98/52312 A2 | 11/1998 |
| WO | 98/57472 A | 12/1998 |
| WO | 98/59476 A1 | 12/1998 |
| WO | 99/16224 A | 4/1999 |
| WO | 99/18701 A1 | 4/1999 |

OTHER PUBLICATIONS

John A.C. Bingham (May 1990), "Multicarrier Modulation for Data Transmission:" An Idea Whose Time Has Come, IEEE Communications Magazine. pp. 5-14.

John A.C. Bingham (May 1996), "RFI Suppression in Multicarrier Transmission Systems," Amati Communications, IEEE Communications Magazine, pp. 1026-1030.

John M. Cioffi "A Multicarrier Primer," Amati Communications Corporation and Stanford University, Nov. 1991, pp. 1-18.

Shoham et al. (Sep. 1998), "Efficient Bit Allocation for an Arbitrary Set of Quantizers," IEEE Transactions on Acoustics, Speech and Signal Processing, 36(9): 1445-1453.

"A Series of New Chipset Models—Transmission Scheme is Bipolarized in CAP and DMT", Nikkei Electronics, Japan, Nov. 18, 1996, pp. 104-108.

"Dual PLL Synthesizer for PHS Cell Station", Yoshihisa Suzuki et al., National Technical Report, Japan, Matsushita Electric Industrial Co., Ltd., Aug. 1996, vol. 42, No. 4, pp. 9-13.

Notice of Allowability, mailed Apr. 23, 2001, for U.S. Appl. No. 09/485,614.

Office Action, mailed Jan. 18, 2001, for U.S. Appl. No. 09/485,614.

Notice of Allowability, mailed Jan. 28, 2003, for U.S. Appl. No. 09/573,816.

Office Action, mailed Jun. 5, 2002, for U.S. Appl. No. 09/573,816.

Office Action, mailed Sep. 25, 2002, for U.S. Appl. No. 09/573,816.

Office Action, mailed Apr. 7, 2003, for U.S. Appl. No. 10/189,212.

Office Action, mailed Dec. 13, 2006, for U.S. Appl. No. 10/613,052.

Office Action, mailed Mar. 22, 2007, for U.S. Appl. No. 10/635,449.

Office Action, mailed Oct. 4, 2007, for U.S. Appl. No. 11/769,420.

Office Action, mailed Sep. 11, 2008, for U.S. Appl. No. 11/769,420.

Office Action, mailed May 2, 2001, for AU Patent Application 10776/99.

Office Action, mailed Sep. 4, 2001, for AU Patent Application 10776/99.

Office Action, mailed Oct. 30, 2001, for AU Patent Application 10776/99.

Office Action, mailed Aug. 14, 2006, for AU Patent Application 2003262111.

Office Action, mailed Apr. 23, 2003, for AU Patent Application 45836/02.

Office Action, mailed Feb. 5, 2008, for CA Patent Application 2306255.

Office Action, mailed May 24, 2007, for CA Patent Application 2306255.

Office Action, mailed Dec. 5, 2005, for CA Patent Application 2306255.

Search Report, mailed Nov. 30, 2009, for EP Patent Application 09012799.4.

Office Action, mailed Feb. 1, 2007, for EP Patent Application 98953385.6.
Office Action, mailed Aug. 20, 2004, for EP Patent Application 98953385.6.
Office Action, mailed Oct. 23, 2003, for EP Patent Application 98953385.6.
Office Action, mailed Feb. 13, 2002, for JP Patent Application 2000-516470.
Office Action, mailed Jul. 10, 2002, for JP Patent Application 2000-516470.
Office Action, mailed Nov. 6, 2002, for JP Patent Application 2000-516470.
Office Action, mailed Apr. 6, 2009, for JP Patent 2001-398290.
Office Action, mailed Nov. 24, 2009, for JP Patent Application 2001-398290.
Office Action, mailed Jun. 2, 2008, for JP Patent Application 2001-398290.
Office Action, mailed Mar. 23, 2009, for JP Patent Application 2005-295154.
Office Action, mailed Jun. 2, 2008, for JP Patent Application 2005-295154.
Office Action, mailed Aug. 30, 2005, for KR Patent Application 7003893/2000.
International Search Report, mailed Jun. 24, 1999, for PCT/US98/21442.
Preliminary Exam Report, mailed Feb. 1, 2000, for PCT/US98/21442.
Office Action for EP Patent Application 09012799.4 mailed Sep. 17, 2010, 4 pages.
Office Action for JP Patent Application 2001-398290 mailed Oct. 19, 2010, 7 pages.
Office Action for JP Patent Application 2001-398290, mailed Feb. 22, 2011, 2 pages.

* cited by examiner

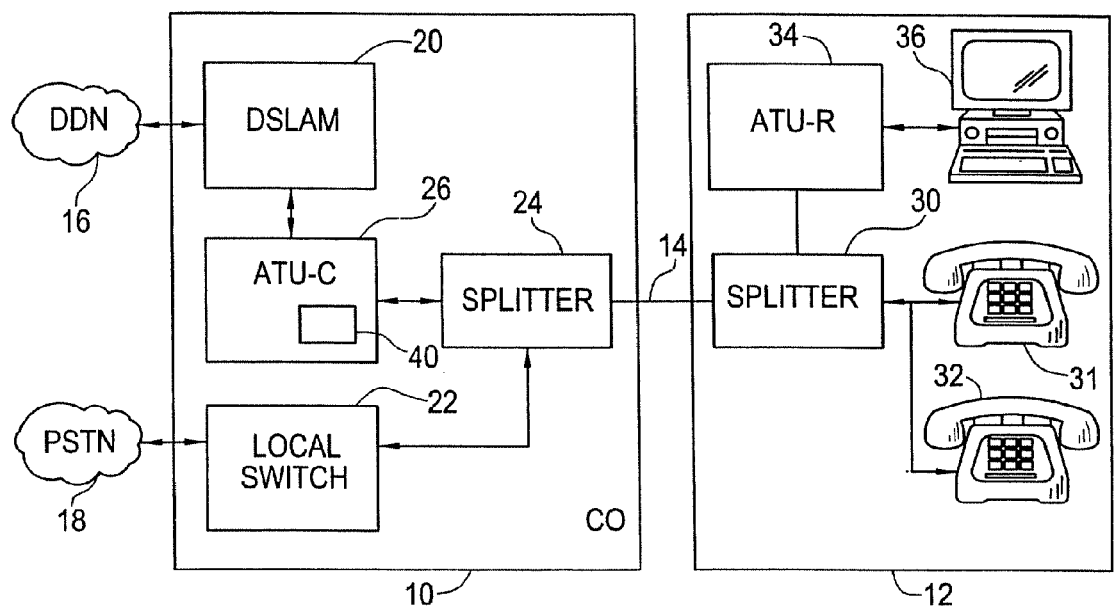

FIG. 5A

|  | SC (45c) | B (45d) | G (45e) | FDQ (45f) | TDQ (45g) | EC (45h) |
|---|---|---|---|---|---|---|
| 45a | 9 | 8 | 0 | | | |
| | 10 | 8 | 0 | | | |
| | 11 | 7 | 1 | | | |
| | 12 | 8 | 0 | | | |
| 45b | 40 | 7 | 1 | a | c | e |
| | 41 | 7 | 1 | a | c | e |
| | 42 | 7 | 1 | a | c | e |
| | 43 | 6 | 1.3 | b | d | f |
| | : | : | : | : | : | : |

FIG. 5B

|  | SC (47f) | B (47g) | G (47h) | FDQ (47i) | TDQ (47j) | EC | B (47b) | G | FDQ | TDQ | EC | B (47c) | G | FDQ | TDQ | EC (47c) |
|---|---|---|---|---|---|---|---|---|---|---|---|---|---|---|---|---|
| 47d | 9 | 7 | 1 | | | | 8 | -8 | | | | 8 | -8 | | | |
| | 10 | 6 | 1.3 | | | | 8 | -8 | | | | 8 | -8 | | | |
| | 11 | 7 | 1 | | | | 7 | -8 | | | | 7 | -8 | | | |
| | 12 | 7 | 1 | | | | 8 | -8 | | | | 8 | -8 | | | |
| 47e | 40 | 7 | 1 | g | i | k | 7 | 1 | m | p | s | 6 | 1.3 | u | x | t |
| | 41 | 7 | 1 | g | j | k | 6 | 1.3 | n | q | t | 4 | 1.6 | v | y | 1 |
| | 42 | 7 | 1 | h | i | k | 5 | 1.5 | o | r | u | 5 | 1.5 | w | z | r |
| | 43 | 6 | 1.3 | g | i | l | 6 | 1 | n | q | t | 6 | 1.3 | v | x | t |
| | : | : | : | : | : | : | : | : | : | : | : | : | : | : | : | : |

SET NO. 1

| SC | SNR | B | G | FDQ | TDQ | EC |
|----|-----|---|---|-----|-----|-----|

254 260 256 258 260 262 266

250

SET NO. 2

| SC | SNR | B | G | FDQ | TDQ | EC |
|----|-----|---|---|-----|-----|-----|

252

| SC | B1 | B2 | B3 | B4 | B5 | B' |
|----|----|----|----|----|----|----|
| 9  | 8  | 7  | 7  | 6  | 5  | 5  |
| 10 | 8  | 6  | 6  | 4  | 4  | 4  |
| 11 | 7  | 7  | 6  | 5  | 5  | 5  |
| 12 | 8  | 7  | 6  | 5  | 5  | 5  |
|    |    |    |    |    |    |    |
| 40 | 7  | 7  | 6  | 6  | 5  | 5  |
| 41 | 7  | 7  | 6  | 5  | 5  | 5  |
| 42 | 7  | 7  | 6  | 5  | 5  | 5  |
| 43 | 6  | 7  | 6  | 5  | 5  | 5  |
| :  | :  | :  | :  | :  | :  | :  |

49e, 49a, 49b, 49c, 49d, 49f 270  272  274  276
{SET No., SNR1, SNR2, SNR3, ...}

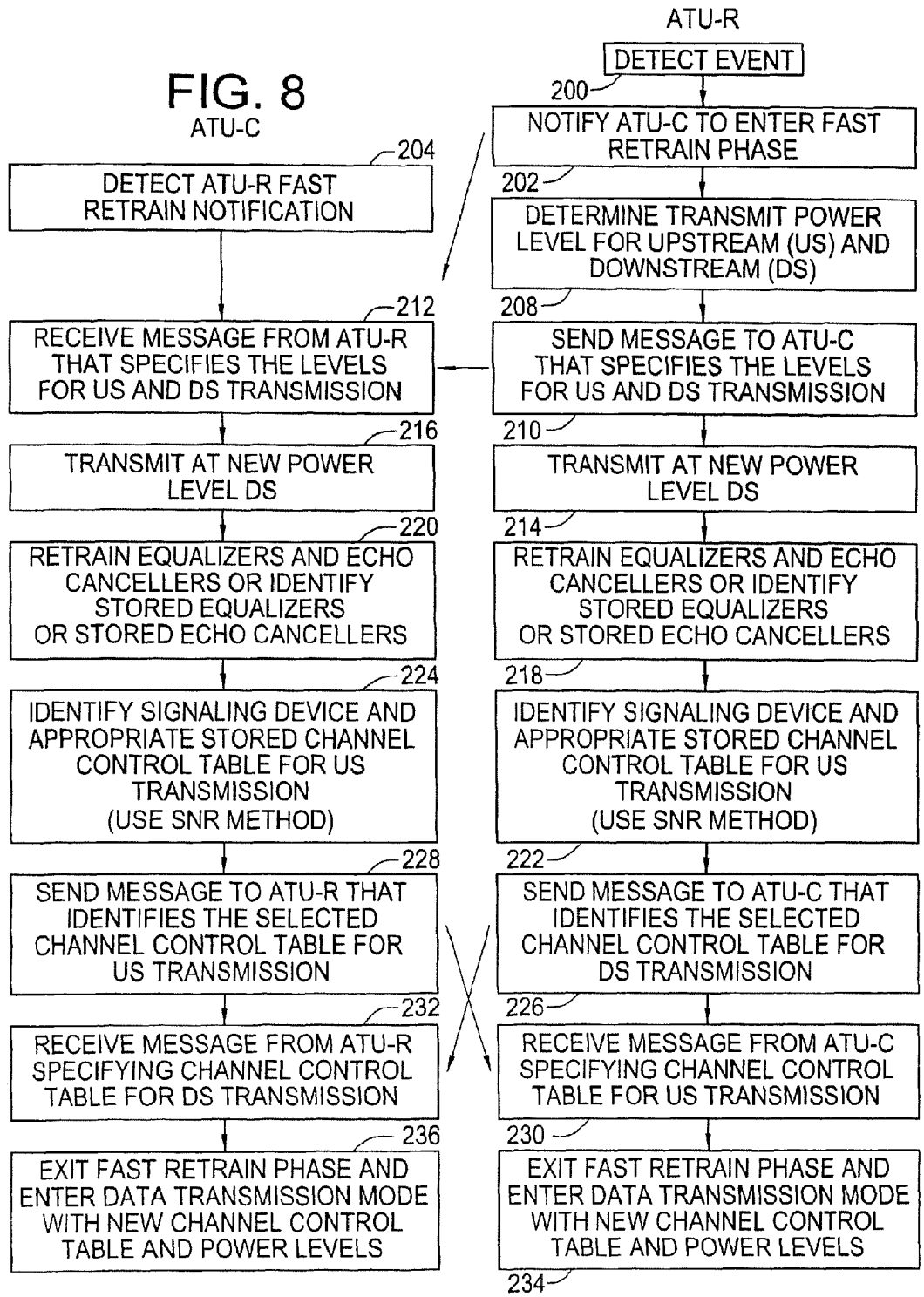

SPLITTERLESS MULTICARRIER MODEM

CROSS-REFERENCE TO RELATED APPLICATIONS

This application is a divisional application of U.S. patent application Ser. No. 11/769,420 filed Jun. 27, 2007 now abandoned, which is a continuation application of U.S. patent application Ser. No. 10/635,449 filed Aug. 7, 2003 now abandoned, which is a divisional application of U.S. patent application Ser. No. 10/189,212, filed Jul. 5, 2002 now abandoned, which is a divisional application of U.S. patent application Ser. No. 09/573,816, filed May 17, 2000, now U.S. Pat. No. 6,549,520, which is a continuation of U.S. patent application Ser. No. 09/485,614, filed on Feb. 11, 2000, now U.S. Pat. No. 6,266,348, which is a national stage application under 35 U.S.C. §371 of International Application No. PCT/US98/21442, filed on Oct. 9, 1998, which claims priority to the following Provisional Applications:

U.S. Provisional Patent Application Ser. No. 60/061,689, filed Oct. 10, 1997 by Richard Gross, John Greszcuk, Dave Krinsky, Marcos Tzannes, and Michael Tzannes and entitled "Splitterless Multicarrier Modulation For High Speed Data Transport Over Telephone Wires";

U.S. Provisional Patent Application Ser. No. 60/071,701 filed Jan. 16, 1998 by Richard Gross and Michael Tzannes and entitled "Dual Rate Multicarrier Transmission System in a Splitterless Configuration";

U.S. Provisional Patent Application Ser. No. 60/072,986 filed Jan. 21, 1998 by Richard Gross, Marcos Tzannes and Michael Tzannes and entitled "Dual Rate Multicarrier Transmission System In A Splitterless Configuration", and U.S. Provisional Patent Application Ser. No. 60/072,450 filed Jan. 26, 1998 by Richard Gross, Marcos Tzannes and Michael Tzannes and entitled "Multicarrier System With Dynamic Power Levels".

The disclosures of these applications are incorporated by reference herein in their entirety.

BACKGROUND OF THE INVENTION

1. Field of the Invention

The invention relates to telephone communication systems and, more particularly, to telephone communication systems which utilize discrete multitone modulation to transmit data over digital subscriber lines.

2. Prior Art

The public switched telephone network (PSTN) provides the most widely available form of electronic communication for most individuals and businesses. Because of its ready availability and the substantial cost of providing alternative facilities, it is increasingly being called upon to accommodate the expanding demands for transmission of substantial amounts of data at high rates. Structured originally to provide voice communication with its consequent narrow bandwidth requirements, the PSTN increasingly relies on digital systems to meet the service demand.

A major limiting factor in the ability to implement high rate digital transmission has been the subscriber loop between the telephone central office (CO) and the premises of the subscriber. This loop most commonly comprises a single pair of twisted wires which are well suited to carrying low-frequency voice communications for which a bandwidth of 0-4 kHz is quite adequate, but which do not readily accommodate broadband communications (i.e., bandwidths on the order of hundreds of kilohertz or more) without adopting new techniques for communication.

One approach to this problem has been the development of discrete multitone digital subscriber line (DMT DSL) technology an its variant, discrete wavelet multitone digital subscriber line (DWMT DSL) technology. These and other forms of discrete multitone digital subscriber line technology (such as ADSL, HDSL, etc.) will commonly be referred to hereinafter generically as "DSL technology" or frequently simply as "DSL". The operation of discrete multitone systems, and their application to DSL technology, is discussed more fully in "Multicarrier Modulation For Data Transmission: An Idea Whose Time Has Come.", IEEE Communications Magazine, May, 1990, pp. 5-14.

In DSL technology, communications over the local subscriber loop between the central office and the subscriber premises is accomplished by modulating the data to be transmitted onto a multiplicity of discrete frequency carriers which are summed together and then transmitted over the subscriber loop. Individually, the carriers form discrete, non-overlapping communication subchannels of limited bandwidth; collectively, they form what is effectively a broadband communications channel. At the receiver end, the carriers are demodulated and the data recovered from them.

The data symbols that are transmitted over each subchannel carry a number of bits that may vary from subchannel to subchannel, dependent on the signal-to-noise ratio (SNR) of the subchannel. The number of bits that can accommodated under specified communication conditions is known as the "bit allocation" of the subchannel, and is calculated for each subchannel in a known manner as a function of the measured SNR of the subchannel and the bit error rate associated with it.

The SNR of the respective subchannels is determined by transmitting a reference signal over the various subchannels and measuring the SNR's of the received signals. The loading information is typically calculated at the receiving or "local" end of the subscriber line (e.g., at the subscriber premises, in the case of transmission from the central telephone office to the subscriber, and at the central office in the case of transmission from the subscriber premises to the central office) and is communicated to the other (transmitting or "remote") end so that each transmitter-receiver pair in communication with each other uses the same information for communication. The bit allocation information is stored at both ends of the communication pair link for use in defining the number of bits to be used on the respective subchannels in transmitting data to a particular receiver. Other subchannel parameters such as subchannel gains, time and frequency domain equalizer coefficients, and other characteristics may also be stored to aid in defining the subchannel.

Information may, of course, be transmitted in either direction over the subscriber line. For many applications, such as the delivery of video, internet services, etc. to a subscriber, the required bandwidth from central office to subscriber is many times that of the required bandwidth from subscriber to central office. One recently developed service providing such a capability is based on discrete multitone asymmetric digital subscriber line (DMT ADSL) technology. In one form of this service, up to two hundred and fifty six subchannels, each of 4312.5 Hz bandwidth, are devoted to downstream (from central office to subscriber premises) communications, while up to thirty two subchannels, each also of 4312.5 Hz bandwidth, provide upstream (from subscriber premises to central office) communications. Communication is by way of "frames" of data and control information. In a presently-used form of ADSL communications, sixty eight data frames and one synchronization frame form a "superframe" that is repeated throughout the transmission. The data frames carry the data that is to be transmitted; the synchronization or "sync" frame provides a known bit sequence that is used to synchronize the transmitting and receiving modems and that also facilitates determination of transmission subchannel characteristics such as signal-to-noise ratio ("SNR."), among others.

Although such systems do in fact provide a significantly increased bandwidth for data communications, special precautions are required to avoid interference with, and from, ordinary voice communications and associated signaling that may be taking place over the subscriber line at the same time that the broadband data is being carried. The signaling activities commonly include, for example, the transmission of ringing signals, busy tone, off-hook indications, on-hook indications, dialing signals, and the like, and the actions commonly accompanying them, e.g., taking the phone off-hook, replacing it on-hook, dialing, etc. These voice communications and their associated signaling, commonly referred to as "plain old telephone service" or POTS, presently are isolated from the data communications by modulating the data communications onto frequencies that are higher than those used for POTS; the data communications and POTS signals are thereafter separately retrieved by appropriate demodulation and filtering. The filters which separate the data communications and the POTS are commonly referred to as "POTS splitters".

The voice and data communications must be separated at both the central office and the subscriber premises, and thus POTS splitters must be installed at both locations. Installation at the central office is generally not a significant problem, since a single modem at the central office can serve a large number of subscribers, and technicians are commonly available there. Installation at the customer premises is a problem. Typically, a trained technician must visit the premises of every subscriber who wishes to use this technology in order to perform the requisite installation. In connection with this, extensive rewiring may have to be done, dependent on the desired location of the ADSL, devices. This is expensive and discourages the use of DSL technology on a widespread basis.

DSL systems also experience disturbances from other data services on adjacent phone lines (such as ADSL, HDSL, ISDN, or T1 service). These services may commence after the subject ADSL service is already initiated and, since DSL for internet access is envisioned as an always-on service, the effect of these disturbances must be ameliorated by the subject ADSL transceiver.

SUMMARY OF THE INVENTION

Objects of the Invention

Accordingly, it is an object of the invention to provide an improved digital subscriber line communication system.

Further, it is an object of the invention to provide a digital subscriber line communication system which is compatible with existing voice communication services and which does not require the use of POTS splitters.

Another object of the invention is to provide an improved digital subscriber line communication system that efficiently handles data communications despite random interruptions associated with concurrent carriage of voice communications or disturbances that arise from concurrent data services on adjacent phone lines.

SUMMARY DESCRIPTION OF THE INVENTION

Splitterless Operation

The invention described herein is directed to enhancing the accuracy and reliability of communications in systems using discrete multitone technology (DMT) to communicate data over digital subscriber lines (DSL) in the presence of voice communications and other disturbances. For simplicity of reference, the apparatus and method of the present invention will hereinafter be referred to collectively simply as a modem. One such modem is typically located at a customer premises such as a home or business and is "downstream" from a central office with which it communicates; the other is typically located at the central office and is "upstream" from the customer premises. Consistent with industry practice, the modems are often referred to herein as "ATU-R" ("ADSL Transceiver Unit, Remote", i.e., located at the customer premises) and "ATU-C" ("ADSL Transceiver Unit, Central Office"). Each modem includes a transmitter section for transmitting data and a receiver section for receiving data, and is of the discrete multitone type, i.e., it transmits data over a multiplicity of subchannels of limited bandwidth. Typically, the upstream or ATU-C modem transmits data to the downstream or ATU-R modem over a first set of subchannels, commonly the higher-frequency subchannels, and receives data from the downstream or ATU-R modem over a second, usually smaller, set of subchannels, commonly the lower-frequency subchannels.

Heretofore, such modems have required POTS splitters when used on lines carrying both voice and data. In accordance with the present invention, we provide a data modem for use in discrete multitone communication systems which carry voice and data communications simultaneously and which operate without the special filtering provided by POTS splitters; they are thus "splitterless" modems. In the absence of certain disturbances, referred to herein as "disturbance events" and discussed more fully hereinafter, the modem of our invention transmits data at a rate determined by the transmission capabilities of the system without regard to such disturbances. Preferably, this is the maximum data rate that can be provided for the particular communications subchannel, subject to predefined constraints such as maximum bit error rate, maximum signal power, etc. that may be imposed by other considerations. On the occurrence of a disturbance event on the communications channel, however, the modem of the present invention detects the event and thereupon modifies the subsequent communication operations. Among other responses, the modem changes the bit allocations (and thus possibly the corresponding bit rate) and the subchannel gains among the subchannels, so as to limit interference with and from voice communication activities or to compensate for disturbances from other services or sources sufficiently close to the subject subscriber line as to couple interfering signals into the line. The bit allocations and subchannel gains may be altered for communications in either direction, i.e., upstream, downstream, or both. Effectively, this matches the subchannel capacity to the selected data rate so as to ensure that the pre-specified bit error rate is not exceeded. On cessation of the disturbance event, the system is returned to its initial, high-rate, state.

Disturbance Events

Of particular interest to the present invention are disturbance events that arise from the occurrence of voice communication activities over the data link concurrent with the transmission of data over the link. These activities comprise the voice communications themselves, or activities such as signaling associated with such communications, together with the response to such activities, such as taking a phone off-hook or placing it on-hook. Disturbance events also include other disruptive disturbances such as interference from adjacent phone lines caused, for example, by the presence of other DSL services, ISDN services, T1 services, etc. The cessation of a disturbance event may itself also comprise a disturbance event. For example, the change of a voice communications device such as a telephone from "on-hook" to "off-hook" status can seriously disrupt communications at a modem unless compensated for as described herein or unless otherwise isolated from the modem by means of a POTS splitter as was heretofore done; it is thus a disturbance event that must be dealt with. However, the return of such a device to "on-hook" status can also significantly change the channel characteristics and is therefore also a disturbance event that must be dealt with. The invention described herein efficiently addresses these and other disturbance events.

Channel Control Parameter Sets

In accordance with the present invention, the change in bit allocation is accomplished rapidly and efficiently by switching between stored parameter sets which contain one or more channel control parameters that define data communications by the modem over the subchannels. The parameters sets are preferably determined at the time of initialization of the modem and stored in registers other memory (e.g., RAM or ROM) in the modem itself, but may instead be stored in devices external to, and in communication with, the modem, e.g., in personal computers, on disk drives etc.

In accordance with one embodiment of this invention, the channel control parameter sets comprise at least a primary set of channel control parameters, stored in a primary channel control table, which defines communications in the absence of voice communication activities or other disturbances; and one or a plurality of secondary sets of channel control parameters, stored in a secondary channel control table, that define data communications responsive to one or more disturbance events. When communicating under control of the primary channel control table, the modem is described hereinafter as being in its "primary" state; when communicating under control of the secondary channel control table, the modem is described hereinafter as being in its "secondary" state. The modem is switched between parameter sets in its primary secondary states responsive to the occurrence and cessation of disturbance events, as well as among parameter sets in the secondary table responsive to a change from one disturbance event to another. Since the parameter sets are pre-stored and thus need to be exchanged at the time of a disturbance event, the switch is made quickly, limited essentially only by the speed with which the disturbance event is detected and signaled to the other modem participating in the communication, typically not more than a second or so. This greatly reduces the interruption in communications that would otherwise be required by a complete reinitialization of the modems that typically extends over six to ten seconds, and its associated exchange channel control parameters.

As noted previously, in DSL communications, information transmission typically takes place in both directions, i.e. the upstream or ATU-C modem transmits downstream to the ATU-R modem over a first set of subchannels, and the downstream or ATU-R modem transmits upstream to the ATU-C modem over a second, different, set of subchannels. The transmitter and receiver at each modem, accordingly, maintain corresponding channel tables to be used by them in transmitting data to, and receiving data from, the other modem with which it forms a communications pair. Certain parameters such as time and frequency domain equalizer coefficients and echo canceller coefficients are "local" to the receiver with which they are associated, and thus need to be maintained only at that receiver. Other parameters such as bit allocations and channel gains are shared with the other modem with which a given modem is in communication (the "modem pair") and thus are stored in both modems, so that during a given communication session, the transmitter of one modem will use the same set of values of a shared parameter as the receiver of the other modem, and vice versa.

In particular, in DSL communications, a key parameter is the number of bits that are to be transmitted over the various subchannels. This is known as the "bit allocation" for the respective subchannels, and is a key element of the primary and secondary parameter sets. It is calculated in a known manner for each subchannel based on the channel SNR, the acceptable bit error rate, and the noise margin of the subchannel. Another important element is the gain for each of the subchannels, and is thus preferably also included in the primary and secondary parameter sets. Thus, each receiver stores a primary channel control table and a secondary channel control table, each of which contains one or more parameter sets that define the subchannel bit allocations to be used by it and by the transmitter of the other modem in communicating with it, and each transmitter also stores a primary channel control table and a secondary channel control table, each of which define the subchannel bit allocations and gains to be used by it for transmission to the other receiver and for reception at that receiver. For the closest match to the actual line over which they are to communicate, those portions of the primary and secondary channel control table at each receiver that define the parameters for use in transmitting to the particular receiver are preferably determined at the modem at which the receiver is located (the "local modem"), as described herein, but it will be understood from the detailed description herein that such tables may also be determined in other ways.

As long as communications over the subscriber line are not impaired by a disturbance event, the modems use the primary channel control table to define communications over the subchannels. When, however, a disturbance event occurs, the modem that detects the event (herein designated "the local modem"; typically, this will be the subscriber modem, ATU-R, particularly in cases of activation of a voice communications device by the subscriber) notifies the other modem of the need to change to the secondary channel control table, and identifies the specific bit allocation set and/or gain set in the secondary table when more than one such set exists. The notification procedure is described in more detail hereinafter. Communications thereafter continue in accordance with the appropriate parameter set (i.e., bit allocations, subchannel gains, and possibly other parameters) from the secondary channel control table. This condition continues until a new disturbance event is detected, at which time the modems revert to the primary channel control table (in the event the disturbance is simply the cessation of communication-disrupting disturbances or interferences) or to a different parameter set secondary channel control table (in the event that the disturbance event is the occurrence of another communication-disrupting disturbance or interference).

In addition to changes in bit allocation among the subchannels, and changes in subchannel gains, further changes may also be made in such communication parameters as time domain equalizer coefficients, frequency domain equalizer coefficients, and the like. These parameters may also be stored in the channel control tables for use in controlling communications, or may be stored in separate tables. Additionally, changes in power level (and corresponding changes in bit allocation and other communication parameters) for communications in either the upstream or the downstream direction, or both, may be made, and sets of control parameters may be defined on these power levels as well for use in controlling communications. These changes are described in fuller detail below.

As presently contemplated, each modem on the subscribed side of the DSL line will communicate with a corresponding dedicated modem on the central office side. Thus, each central office modem (ATU-C) need store the primary and secondary tables for a specific subscriber only. However, efficiencies may be achieved whenever it is unnecessary to provide service to each subscriber at all times. Under these circumstances, a central office modem may be shared among two or more subscribers, and switched among them as called for. In such a case, the ATU-C will store or have access to a set of channel control tables for each subscriber modem it is to service.

Table Initialization

In the preferred embodiment of the invention, the primary and secondary channel control tables are determined in an initial "training" session ("modem initialization") in which known data is transmitted by one modem, measured on reception by the other, and the tables calculated based on these measurements. Typically, the training session occurs when the modem is first installed at the subscriber premises or at the central office, and the procedures thus "particularizes" the modem to the environment in which it will operate. This environment includes, in addition to the subject data modem, one or more voice communication devices such as telephone handsets, facsimile machines, and other such devices which communicate over a voice frequency subchannel, typically in the range 0-4 kHz. A primary channel control table, comprising a parameter set including at least a set of subchannel bit allocations, and preferably also subchannel gains, is calculated with each device inactive. A secondary channel control table comprising one or more bit communication parameter sets (bit allocations, gains, etc.) is calculated with each voice communication device activated separately, and/or with groups of devices activated concurrently. The tables so determined are then stored at the receiver of one modem and additionally are communicated to the transmitter of the other modem and stored there for use by both modems in subsequent communications.

An alternative approach determines the secondary channel control table (including one or more parameter sets comprising the table) by calculation from the primary channel control table. This is accomplished most simply, for example, by taking one or more of the parameters (e.g., the bit allocation parameter which defines the number of bits to be used for communication across the respective subchannels) as a percentage, fixed or varying across the subchannels, of the corresponding primary parameters; or as determined in accordance with a percentage, fixed or varying across the subchannels, of the SNR's of the respective subchannels; or as determined in accordance with a different bit error rate than provided for in the primary channel control table; or by other techniques.

As a specific example, a number of different sets of bit allocations in the secondary channel control table may be determined as differing percentages (fixed or varying across the subchannels) of the corresponding set of bit allocations in the primary channel control table. Each secondary bit allocation set corresponds to the effect commonly produced by a particular device or class of devices, e.g., a telephone handset, a facsimile machine, etc., as determined by repeated measurements on such devices, and thus may be taken to represent the expected effect of that device over a range of communication conditions, e.g., with a particular type of subscriber line wiring, at a given range from the central office, etc. The subchannel gains may also then be adjusted based on the redetermined bit allocations. The bit allocations and subchannel gains so determined form new secondary parameter sets which may be used responsive to detection of the disturbance events they characterize, and which substitute for determination of the secondary bit allocations and gains on the basis of measurements of the actual disturbances being compensated for.

Alternatively, the secondary channel control table may be determined by adding a power margin to the calculations for each of the entries of the primary table of a magnitude sufficient to accommodate the interference from activation of the voice communications device or from other disturbances. This has the effect of reducing the constellation size for the table entries. The margin may be uniform across the table entries, or may vary across them, as may the percentage factor when that approach is used. Multiple secondary bit allocation sets may be defined by this approach, each based on a different power margin.

One example of the use of varying margins is in response to changes in crosstalk (capacitively coupled noise due to nearby xDSL users, where the "x" indicates the possible varieties of DSL such as ADSL, HDSL, etc.). This crosstalk is, in general, more predictable than signaling events associated with voice communications. The crosstalk spectrum of xDSL sources is well characterized: see for example, the T1.413 ADSL standard published by the American National Standards Institute. From a primary channel control table associated with a single full initialization, a secondary table comprising a family of bit allocation sets can be calculated, each corresponding to a different crosstalk level. As the number of xDSL systems (and thus crosstalk levels) changes, the ADSL link can quickly switch to one of these automatically generated sets.

The secondary channel control table in the present invention may also be adapted dynamically, e.g., by performing measurements on the transmitted information in each superframe during data communications and monitoring these measurements to determine when the channel performance has sufficiently changed that a different bit allocation set, and possibly different gain set, should be used. We have found that the SNR provides a readily measurable and reliable indicator of the required bit allocations and gains.

In particular, we have found that measurements of the SNR levels across a number of the subchannels during a given communications condition or state provides a "fingerprint" which may reliably be used to quickly select a parameter set, such as the set of bit allocations or the set of gains, for use in subsequent communications during that state. These measurements may be made, for example, on the sync frame that occurs in each superframe or, more generally, during the transmission of reference frames. When the SNRs change by more than a defined amount during communications, the modem at which the measurement is made searches the stored parameter sets for a set whose SNR's on the corresponding subchannels is closest to the measured SNRs, and selects that set for use in subsequent communications. If no parameter set is found within defined limits, the system may be switched t a default state, or a complete reinitialization may be called for, corresponding to a defined pattern of SNR's across some or all of the subchannels, should be used. SNR measurements may also be made on the data carrying signals themselves, i.e., a decision-directed SNR measurement.

Instead of using a multiplicity of secondary subchannel control parameter sets as described above, a simplified approach may constrict and use a single secondary set based on a composite of the bit allocation or other characteristics of the individual devices. In one embodiment, the composite is formed by selecting, for each subchannel, the minimum bit allocation exhibited by any device for that subchannel, or the most severe characteristic of any other disturbances, thus forming a single "worst case" set that may be used when any device is activated, regardless of the specific device or disturbance actually present. Or it may be determined as the actual or calculated capacity of the line when all devices are actually or theoretically actuated simultaneously, or all disturbances are present, or both concurrently. Bit allocations sets may also be determined for combinations of subsets of such devices and disturbances. A similar approach may be used to handle the situation where several devices are activated at the same time, and the effects of other disturbances such as cross talk, etc. may also be incorporated into a composite set.

A particular parameter set of the secondary channel control table remains in use for the duration of the session in which the voice device is active or until another change of state occurs, e.g., a further voice device is activated or some other disturbance takes place. When this occurs, the local modem renews its identification procedure to enable determination of the appropriate parameter set for the new conditions. At the end of the session in which the voice device is active, the device returns to inactive (i.e., "on-hook") status and the system reverts to its original ("on-hook") status in which the primary channel control table once again is used for communications between the central office and the subscriber.

Switching the subchannel parameter sets in accordance with the present invention is extremely fast. It can be accomplished in an interval as short as several frames, and thus avoids the lengthy (e.g., several second) delay that would otherwise accompany determination, communication, and switching of newly-determined sets. Further, it avoids communicating new parameter sets at a time when communications have been impaired and error rates are high. Thus, it minimizes disruption to the communication process occasioned by disturbance events.

Detecting Disturbance Events

During subsequent data communications, identification of the device that is activated is achieved in one of a number of ways. In one embodiment of the invention, a specific activation signal is transmitted from the device to the modem on the same side of the subscriber line as the device (referred to herein as "the local modem") on activation of the device. This signal may be transmitted over the communications line to which the device and the local modem are connected or it may be sent over a dedicated connection between the device and the local modem.

In the preferred embodiment of the invention, the local modem monitors the subscriber line to which it and the device are connected and detects a change in line characteristics when the device is activated. For example, the signal to noise ratio (SNR) of the various subchannels can quickly be measured and can be used to identify the particular device that is activated. During multiple sets of initializations, corresponding to multiple communication conditions caused by the devices or by other interferences, the SNR measure for each subchannel is determined for each of the conditions to be tracked (i.e., no devices activated, devices activated separately, two or more devices activated concurrently, adjacent channel interferences, etc.) and the measures stored, along with identification of the particular parameter set or sets with which they are associated. When a device is activated, the SNR measurements are used to quickly identify the particular device or devices that have been activated, and the local modem can thereafter switch to the appropriate secondary table.

Disturbance events may also be detected in accordance with the present invention by monitoring selected transmission characteristics that are dependent on these events. These may comprise, in addition to any characteristics SNR accompanying them, such measures as errors in the cyclic redundancy code (CRC) that accompanies transmissions and changes in the error rate of this code; changes in the amplitude, frequency or phase of a pilot tone on the subchannels; or other such indicia. Forward error correction code (FEC) is typically used in ADSL transceivers, and changes in the error rate characteristics of this code, such as how many errors have occurred, how many have been corrected, how many are uncorrected, and the like, can be particularly useful in detecting disturbance events.

In monitoring these characteristics, we distinguish between changes caused by momentary or transient events such as lightning or other such burst noise disturbances, and those associated with disturbance events, the latter continuing for a significant interval (e.g., on the order of seconds or more). In particular, in embodiments that monitor CRC errors or error rates in accordance with the present invention, a switch from one parameter set to another is provided when the errors extend over a number of frames or when the error rate changes by a defined amount for a time greater than a defined minimum. For example, on the occurrence of an off-hook event, a severe form of disturbance to data communications over a subscriber loop, the number of CRC errors suddenly increases and remains at an increased level until it is dealt with. This is distinguished from the occurrence of a transient disturbance such as a lightning strike which causes a momentary increase in CRC errors that does not persist as long as the system has not lost synchronization.

Thus, in accordance with the present invention, the detection of an initial change in the CRC error rate over a number of frames in excess of a defined threshold is one example of the detection of a disturbance event that will result in switching parameter sets. Similar procedures may be undertaken in response to measurement of the signal-to-noise ratio of the subchannel in order to detect a disturbance event based on this characteristic. The decision as to whether a disturbance event has occurred may be based on measurements on a single subchannel; on a multiplicity of subchannels (e.g., the decision to switch parameter sets will be made when more than a defined number of subchannels detect a disturbance event); or the like.

An alternative technique for detecting a disturbance event in accordance with the present invention is the use of a monitor signal, e.g., a pilot tone whose amplitude, frequency, phase or other characteristic is monitored during data transmission. A sudden change in one or more of the monitored characteristics from one frame to another, followed by a smaller or no change in subsequent frames, indicates a disturbance event to which the modem should respond. The monitor signal may comprise a dedicated signal carried by one of the subchannels; a signal carried on a separate control subchannel; a disturbance event itself (e.g., ringing tone, dial tone presence, or other common telephone signals); or other signals.

Communicating the Occurrence of Disturbance Events

After a disturbance event is detected and the appropriate parameter set corresponding to the event is identified, the identification is communicated to the remote modem by means of a selection signal to enable it also to switch to the corresponding parameter set in the secondary table. The selection signal may be in the form of a message transmitted over one or more subchannels or using a predetermined protocol for an embedded operations channel, or it may comprise one or more tones that identify the particular parameter set. ADSL systems use a "guard band" of several subchannels between the sets of subchannels used for upstream and downstream transmission. This guard band may be used to transmit the selection tone or tones. In cases where there is only a single parameter set to be designated, the selection signal may comprise a simple flag (an element that has only two states, i.e., on/off, present/absent, etc.) that is sent to the remote modem to select the set.

In a further embodiment of the invention, use is made of the frame counters at the ATU-R and ATU-C modems that are commonly provided in DSL systems. On detecting a disturbance event, the ATU-R modem notifies the ATU-C modem of the event and specifies a frame at which the change in parameter set, or change in power level and any accompanying change in other parameters, is to take place. The specification may be direct (i.e., the notification specifies a particular frame number at which the change to the secondary table is to be made) or indirect (i.e., on receipt of the notification, the change to the secondary table is made at one of a predetermined number of frames, e.g., the next frame number ending in "0", or in "00", etc., or the nth frame after receiving the notification, where n is some number greater than 0). On reaching the designated frame, both modems (i.e., ATU-R and ATU-C) switch to the new bit allocation set, power level, and other designated parameters.

Alternatively, on detection of a disturbance event, the moderns perform a "fast retrain" in order to characterize communications under the new operating conditions and determine a power and/or bit allocation set to be used for the communications. A fast retrain performs only a limited subset of the full initialization procedures, e.g., bit allocation and subchannel gain determination. The retraining modem (typically the modem local to the disturbance initiating the retraining) then compares the newly determined parameter set with previously stored sets. If the newly-determined set is the same as a previously stored set, a message, flag, or tone is communicated by one modem to the other to designate which of the stored secondary allocation sets is to be used. Otherwise, the newly determined set is used for communications. In the latter event, it must be communicated to the other modem in the communication pair, and communications may be interrupted while this occurs. Nonetheless, on cessation of the event which necessitated a change in parameter sets, the system may simply revert to the primary parameter set, without need for recommunication of that set and thus without further interrupting communications. With proper care in initialization, in most cases a sufficient array of parameter sets may be defined and exchanged at the outset as to avoid the need for subsequent reinitialization in response to most disturbances.

Changing Power Levels

In addition to changing one or more parameter sets in the modem in response to a disturbance event, in accordance with the preferred embodiment of the present invention we also preferably change the communications power level in either the upstream or the downstream direction, or both, in order to further enhance reliable communications. Typically, the change is a reduction in the power level in the upstream direction so as to minimize interference with the voice communications, as well as to reduce echo into the downstream signal, and it will be so described herein. However, it should be understood that there will be some occasions when an increase in power level is called for, such as when interference from adjacent data services requires a higher power level in order to maintain a desired data rate or bit error level, and such a change is accommodated by the present invention in the same manner as that of a decrease. Further, a change in downstream power level may be called for when line conditions change to such an extent that excessive power would otherwise be fed into the downstream channel from the upstream modem.

In theory, and in a perfectly linear system, upstream communications activities should have no effect on concurrent voice communications since the two activities occur in separate, non-overlapping frequency bands. However, the telephone system in fact is not a linear system, and nonlinearities in the system can and do inject image signals from the upstream subchannel into the voice subchannel, and possibly into the downstream subchannel as well (i.e., echo), thus producing detectable interference. In accordance with another aspect of the present invention, this effect is reduced below the level of objection by reducing the upstream power level (the power level at which the subscriber or downstream modem transmits to the central office or upstream modem) by a given amount or factor when conditions dictate, e.g., when a voice communications device is off-hook and leakage from the data communications being conducted interferes with the voice communications.

The amount of power reduction may be set in advance. For example, we have found that a nine db reduction in this power (relative to that typically used in ADSL applications using splitters to separate the data and POTS signals) is sufficient in most cases of common interest; under these circumstances, the system operates in one of two alternative power levels at all times. Alternatively, the downstream modem may select one of several different power levels for use, based on the communication conditions prevailing at the time resultant from the disturbance event. For example, the downstream modem may be activated to send a test signal into one or more upstream subchannels and to monitor the leakage (i.e., the echo) of this signal into one or more downstream subchannels as determined, for example, by the SNRs on these subchannels; the power level at which the downstream modem transmits upstream may then be adjusted accordingly in order to minimize the effects of the echo. Commonly, the downstream transmit power is determined by the ATU-R, since the ATU-R is closest to the cause of the disturbance event. In this event, the ATU-R uses a message, flag, or tone to inform the ATU-C of the desired power level to be used for transmission. In either case, at the end of a session, the power level reverts to that used in the "on-hook" state.

In selecting the desired power level, the transmitting modem signals the receiving modem in the communications-pair of the desired change (including the designation of a particular power level from among several power levels, where appropriate), and thereafter implements the change, including switching to a new parameter set associated with that power level. In another embodiment of the invention, the receiving modem detects the power level change at the transmitting modem and switches to a parameter set associated with that power level; upstream communications (i.e., from the ATU-R to the ATU-C) are thereafter conducted at the new power level until the disturbance event (e.g., off-hook condition, etc.) terminates.

While much of the above has been described in terms of a change in power level in the upstream communications from the subscriber modem to the central office modem, it should be noted that a change in power level in the opposite direction may also sometimes be called for. This may be the case, for example, or short subscriber loops (e.g., less than a mile), where the reduced line loss consequent on the greater proximity to the central office may result in the central office initially transmitting at an excessive power level. In such cases, the central office or ATU-C modem performs the role previously performed by the subscriber or ATU-R modem, and vice versa, and a change in power level and other parameters on the downstream communications may be performed as described above. Further, it should also be understood that while it is expected that the power change will most commonly be one that reduces the power level used to communicate, it may in some cases increase it. This will occur, for example, when crosstalk from adjacent services requires an increase in power level of the subject service in order to compensate for the crosstalk.

Changing Other Parameters

A further important change made in response to detecting a disturbance event is a change in frequency domain equalizers ("FDQ's") associated with each subchannel. These equalizers compensate for the differing distortions (e.g., amplitude loss, phase delay, etc.) suffered by the data during transmission over the subchannel. Typically, they comprise finite impulse response filters with complex coefficients. The coefficients are set during the "initialization" or "training" phase of modem setup. They may subsequently be adjusted based on reference (known) data in reference frames or sync frames transmitted over the communication subchannel. In accordance with the present invention, these filters are adjusted responsive to the transmitted reference data when a disturbance event is detected. The coefficient updating may be performed on all subchannels, or selectively on those whose change in error rates, signal-to-noise ratios, or other error indicia, indicate a disturbance event.

In accordance with one embodiment of the present invention, the coefficients of the frequency domain equalizers for communications both in the absence of a disturbance event or disturbance ("primary FDQ coefficients") and in the presence of such an event or disturbance ("secondary FDQ coefficients") are computed and stored during the initialization or training period. Thereafter, these coefficients are switched responsive to a disturbance event, as is the case with the channel control tables, and are returned to an initial state on the cessation of such an event.

In accordance with another embodiment of the invention, the FDQ coefficients are recomputed responsive to detection of a disturbance event and then used throughout the remainder of the communications session in place of the earlier-stored secondary FDQ tables. The recomputation is accomplished in a short "retrain" session in which known reference data is transmitted between the ATU-R and ATU-C. The received data is compared with the known data and the new FDQ coefficients are determined accordingly. In addition to the frequency domain equalizer coefficients, time domain equalizer coefficients and echo cancellation coefficients may also be determined and stored. Such coefficients are local to the particular receiver, and thus need not be communicated to the other modem of the communications pair. Accordingly, any such retrain will be extremely fast, and any consequent disruption to communication limited.

Excessive Disturbances

In some cases a particular device may cause such interference with communications that compensation for that device by the methods described herein is not practical. This may occur, for example, with antiquated telephones or with particularly complex in-home wiring. In such a case, it is desirable to minimize the disruption caused by such a device by inserting a simple in-line filter between the device and the subscriber line. The filter may comprise, for example, a simple low-pass filter of not more than a cubic inch in volume and a pair of standard connectors such as RJ11 connectors through which the filter connects to the device on one side and to the subscriber line on the other. Unlike POTS splitters, such a connector needs no trained technician to install it, and thus presents no barrier, cost or otherwise, to acceptance of ADSL modems as described herein. Such a device may be detected by measuring the nonlinear distortion of the device when it is activated. This is done by monitoring the echo on the line caused by that device.

Reduced Rate Communications

A further improvement in the operation of the modem of the present invention resides in confining the bandwidth of the downstream transmission to a subset of that normally provided in ADSL communications. This reduces the processing demands on both the local (i.e., central office) and remote (subscriber premises) modems, thereby facilitating the provision of subscriber premises modems at prices more acceptable to consumer, non-business, use; additionally, it further minimizes interference between data transmission and voice communications. For example, limiting the number of subchannels used by the modem to one hundred and twenty eight as opposed to two hundred and fifty six reduces the downstream bandwidth from 1.1 MHz to approximately 552 kHz. When the modem is used with modems that normally provide a greater number of subchannels for such communications, the bit allocations and gains for the subchannels above one hundred and twenty eight are preferably nulled, i.e., set to zero.

The invention is preferably operable with modems that do not have the capabilities described herein, as well, of course, with modems that do. Accordingly, the modem of the present invention identifies its capabilities, preferably during initialization, preparatory to data exchange with another modem. In accordance with the preferred embodiment of the invention, this is preferably done by signaling between the modems that are to participate in communications. The signaling identifies the type of modems in communication and their characteristics of significance to the communication session. For example, one form of ADSL transceiver uses a reduced number of subchannels (typically, thirty two subchannels upstream and one hundred twenty eight subchannels downstream) and provides lower bandwidth communications. A modem having full ADSL capabilities that encounters a reduced-rate modem can then adjust its transmission and reception parameters to match the reduced-rate modem. This may be done, for example, by transmission from one modem to the other of a tone that is reserved for such purposes.

In particular, in accordance with the present invention, on initiation of communications between a central office modem and a subscriber premises modem, the modems identify themselves as "full rate" (i.e., communicating over two hundred fifty six subchannels) or "reduced rate" (e.g., communicating over some lesser number of subchannels, e.g., one hundred and twenty eight). The communication may be performed via a flag (two-state, e.g., "on/off", "present/absent"), a tone or tones, a message (n-state, n>2), or other form of communication, and may be initiated at either end of the communication subchannel, i.e., either the central office end or the customer premises end.

BRIEF DESCRIPTION OF THE DRAWINGS

The invention description below refers to the accompanying drawings, of which:

FIG. 1 is a block and line diagram of a conventional digital subscriber line (DSL) system using POTS splitters that is characteristic of the prior art;

FIG. 2 illustrates an illustrative bit allocation and gains table used in the apparatus of FIG. 1;

FIGS. 5A-5C illustrate channel control tables constructed and used in accordance with the present invention;

FIG. 8 illustrates the preferred procedures used for performing a fast retrain of the modems in accordance with the present invention;

FIGS. 9A and 9B illustrate the manner in which channel control tables may readily be selected in accordance with the present invention; and FIG. 10 illustrates alternative configuration for interconnection of the modems of the present invention.

DETAILED DESCRIPTION OF AN ILLUSTRATIVE EMBODIMENT

Figure 3:
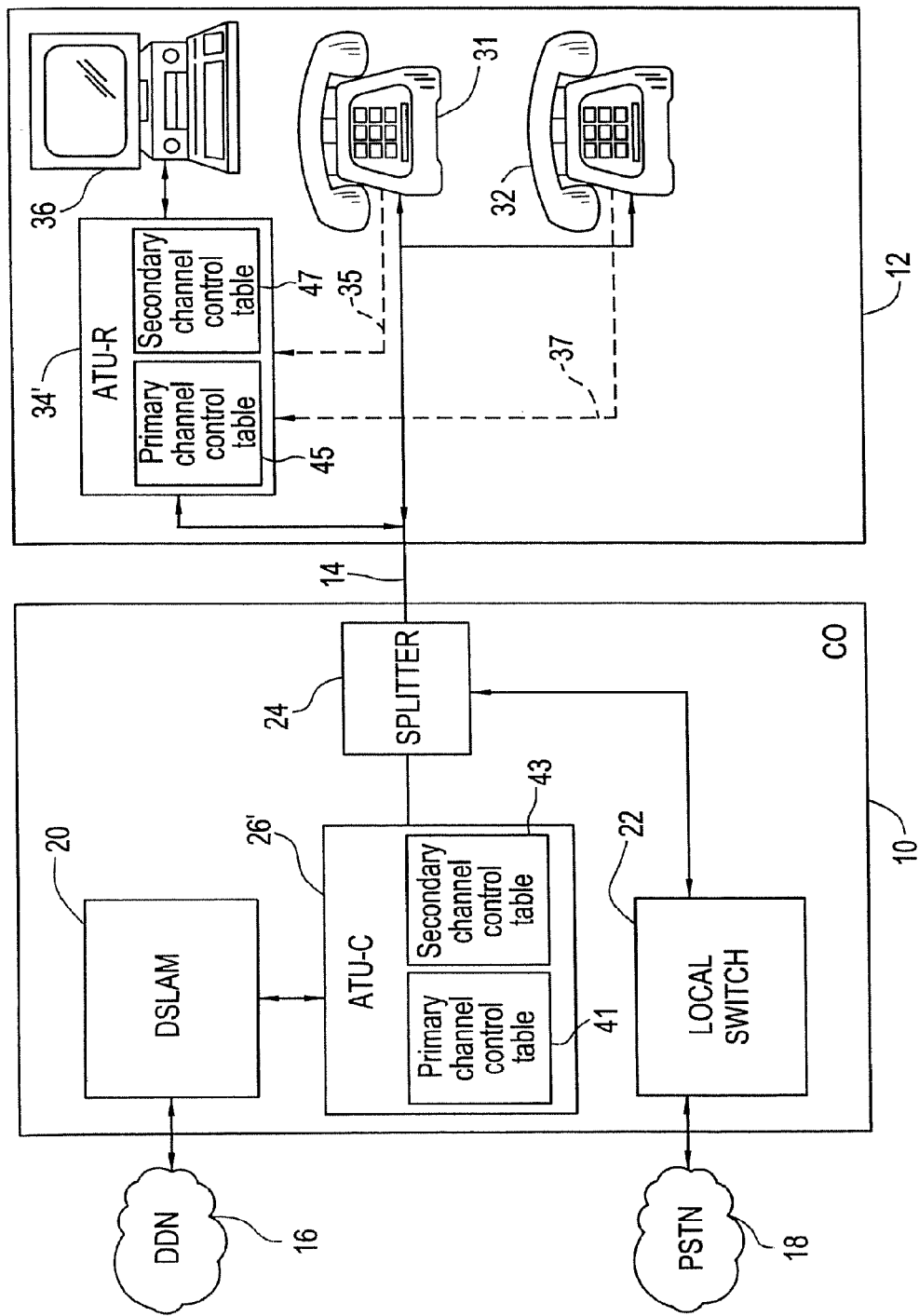
FIG. 3 is a block and line diagram of a splitterless DSL system in accordance with the present invention.

FIG. 1 shows an ADSL communications system of the type heretofore used incorporating "splitters" to separate voice and data communications transmitted over a telephone line. As there shown, a telephone central office ("CO") 10 is connected to a remote subscriber 12 ("CP: Customer Premise") by a subscriber line or loop 14. Typically, the subscriber line 14 comprises a pair of twisted copper wires; this has been the traditional medium for carrying voice communications between a telephone subscriber or customer and the central office. Designed to carry voice communications in a bandwidth of approximately 4 kHz (kilohertz), its use has been greatly extended by DSL technology.

The central office is, in turn, connected to a digital data network ("DDN") 16 or sending and receiving digital data, as well as to a public switched telephone network ("PSTN") 18 for sending and receiving voice and other low frequency communications. The digital data network is connected to the central office through a digital subscriber line access multiplexer ("DSLAM") 20, while the switched telephone network is connected to the central office through a local switch bank 22. The DSLAM 20 (or its equivalent, such as a data enabled switch line card) connects to a POTS "splitter" 24 through an ADSL transceiver unit-central office ("ATU-C") 26. The local switch 20 also connects to the splitter.

The splitter 24 separates data and voice ("POTS") signals received from the line 14. At the subscriber end of line 14, a splitter 30 performs the same function. In particular, the splitter 30 passes the POTS signals from line 14 to the appropriate devices such as telephone handsets 3, 32, and passes the digital data signals to an ADSL transceiver unit-subscriber ("ATU-R") 34 for application to data utilization devices such as a personal computer ("PC") 36 and the like. The transceiver 34 may advantageously be incorporated as a card in the PC itself, similarly, the transceiver 26 is commonly implemented as a line card in the multiplexer 20.

In this approach, a communication channel of a given bandwidth is divided into a multiplicity of subchannels, each a fraction of the subchannel bandwidth. Data to be transmitted from one transceiver to another is modulated onto each subchannel in accordance with the information-carrying capacity of the particular subchannel. Because of differing signal-to-noise ("SNR") characteristics of the subchannels, the amount of data loaded onto a subchannel may differ from subchannel to subchannel. Accordingly, a "bit allocation table" (shown as table 40 at transceiver 26 and table 42 at transceiver 34) is maintained at each transceiver to define the number of bits that each will transmit on each subchannel to the receiver to which it is connected. These tables are created during an initialization process in which test signals are transmitted by each transceiver to the other and the signals received at the respective transceivers are measured in order to determine the maximum number of bits that can be transmitted from one transceiver to the other on the particular line. The bit allocation table determined by a particular transceiver is then transmitted over the digital subscriber line 14 to the other transceiver for use by the other transceiver in transmitting data to that particular transceiver or to any similar transceiver connected to the line 14. The transmission must, of course, be done at a time when the line is not subject to disturbances which may interfere with communications. This is a significant limitation, and restricts the utilization of this approach.

Referring now to FIG. 2, a bit allocation table 42 such as is used in the customer premises equipment is shown in further detail. Table 40, used at the central office, is essentially the same in construction and operation and will not further be described. Table 42 has two sections, a first section, 42a, which defines certain communication parameters such as bit allocation capacity and subchannel gain parameters that characterize the respective subchannels and which the transmitter section of transceiver 34 will use in transmitting a signal to the other transceiver (26) with which it is in communication; and a section 42b that defines the parameters that the receiver section of transceiver 34 will use in receiving a signal transmitted from the other transceiver. Communications take place over a plurality of subchannels, here shown, for purposes of illustration only, as subchannels "9", "10", etc. in the transmitter section, and subchannels "40", "41", etc. in the receiver section. In a full-rate ADSL system, there are up to two hundred and fifty six such subchannels, each of bandwidth 4.1 kHz. For example, in one embodiment of the invention, upstream communications (i.e., from the customer premises to the central telephone office) are conducted on subchannels 8 to 29; downstream communications (from the central office to the customer premises) are conducted on subchannels 32 to 255; subchannels 30 and 31 form a guard band between upstream and downstream communications that may be used for signaling as described hereinafter.

For each subchannel ("SC") 50, a field 52 defines the number of bits ("B") that are to be transmitted over that subchannel by the transmitter of a communications or modem pair, and received by the receiver of that pair, consistent with the prevailing conditions on the subchannel, e.g., measured signal-to-noise ratio (SNR), desired error rate, etc.; column 54 defines the corresponding gains ("G") of the subchannels. A first section, 42a, of the table specifies the bit allocations and gains that transceiver 34 will use in transmitting "upstream" to the transceiver 26; and a second section, 42b, specifies the bit allocations and gains that transceiver 34 will use in receiving transmissions from the transceiver 26. Transceiver 26 has a corresponding table 40 which is the mirror image of table 42, that is, the bit allocations specified for transmission by transceiver 34 are the same as those specified for reception by transceiver 26 and correspondingly for reception by transceiver 34 and transmission by transceiver 26. The table typically may also include a field specifying the gain 54 associated with the particular subchannel.

As noted above, the splitters 24, 30 combine the data and voice communications applied to them for transmission and once again separate these from each other on reception. This is accomplished by means of high pass and low pass filters which separate the low-frequency voice communications from the high-frequency data. The need to utilize such splitters, however, imposes a severe impediment to the widespread adoption of DSL technology by the consumer. In particular, the installation of a splitter at the subscriber premises requires a trip to the premises by a trained technician. This can be quite costly, and will deter many, if not most, consumers from taking advantage of this technology. Nor is incorporating splitters in the communications devices themselves a viable option, since this not only increases the cost of such devices, but requires either the purchase of all new devices or the retrofit of the older devices, which again requires skilled help to accomplish. In accordance with the present invention, we eliminate the splitter at least at the customer premises, thereby enabling adoption and use of DSL modems by the end user without the intervention of trained technical personnel. This, however, requires significant changes in the structure and operation of the DSL transceivers or modems, and the present invention addresses these changes.

In particular, FIG. 3 shows a DSL transmission system in accordance with the invention in which the composite voice-data signal transmitted from the central office to the subscriber premises is passed to both the subscriber voice equipment 31, 32 and to the data transceiver or modem 34' without the interposition of a splitter at the subscriber premises. In FIG. 3, components that are unchanged from FIG. 1 retain the same numbering; components that are modified are designated with a prime superscript. In place of the single table 30 of the transceiver 26 of FIG. 1, the transceiver 26' of FIG. 3 contains a primary channel control table 41 an a secondary channel control table 43. Similarly, transceiver 34' of FIG. 3 contains a primary channel control table 45 and a secondary channel control table 47. It will also be noted that the subscriber side splitter has been eliminated in FIG. 3: the reason why this can be done in the present invention will now be described in detail. It will also be noted that the central office splitter 20 in FIG. 1 has been retained in the configuration of FIG. 3: this is optional, not mandatory. Retraining a splitter at the central office can improve the performance somewhat at little cost, since only a single installation is required and that at the central office itself where technical personnel are commonly available in any event. Where this is not the case, it may be eliminated there also.

Figure 4:
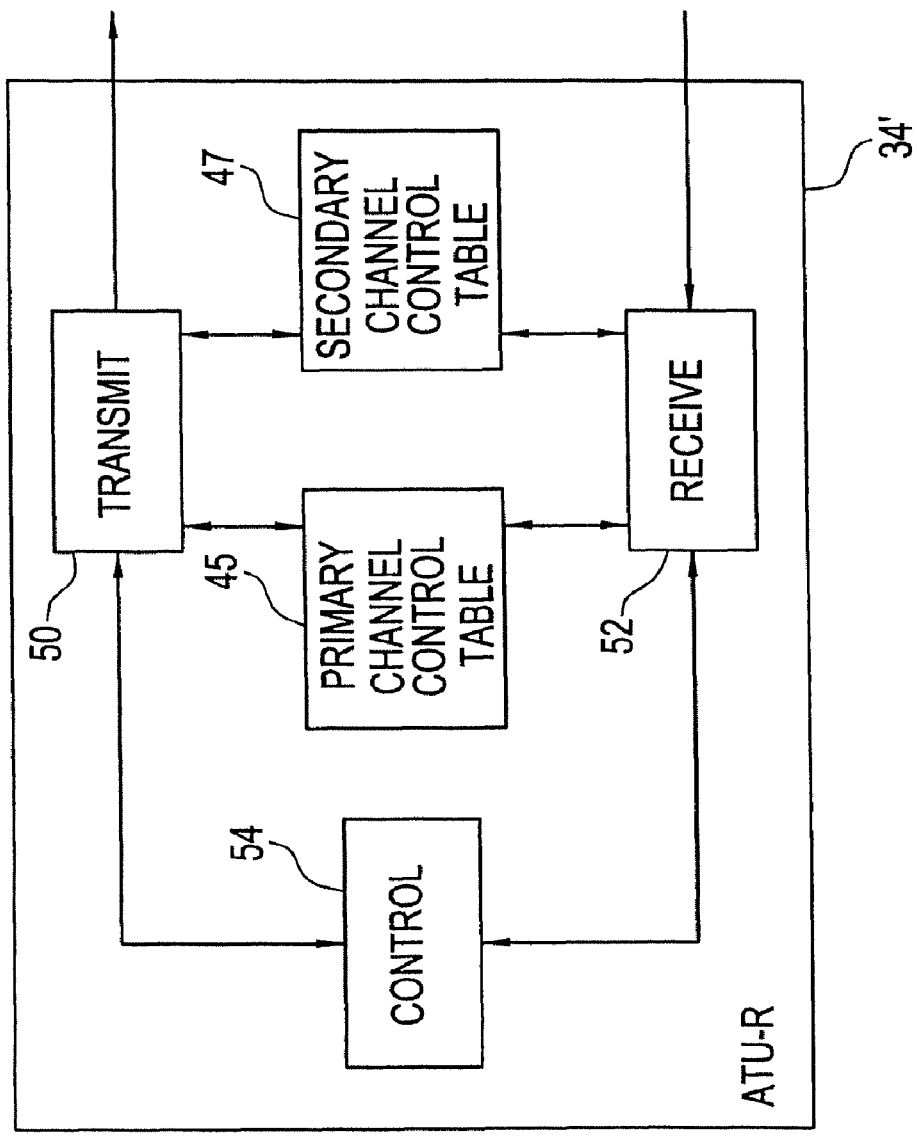
FIG. 4 is a block diagram of a splitterless transceiver in accordance with the present invention.

Turning now to FIG. 4, the transceiver or modem 34' is shown in greater detail; the modem 26' is essentially the same for present purposes and will not be separately described. As indicated, modem 34' comprises a transmitter module 50; a receiver module 52; a control module 54; a primary channel control table 45; and a secondary channel control table 47. The primary channel control table is shown more fully in FIG. 5A; the secondary channel control table is shown more fully in FIG. 5B.

In FIG. 5A, the primary channel control table 45 has a transmitter section 45a which stores a primary set of channel control parameters for use in transmitting to a remote receiver over a DSL line; and a receiver section 45b which stores a primary set of channel control parameters for use in receiving communications over a DSL line from a remote transmitter. The subchannels to which the parameters apply are shown in column 45c. The channel control parameters in the transmitter section 45a include at least a specification of the bit allocations ("B") 45d and preferably also the gains ("G") 45e to be used on the respective subchannels during transmission. The receiver section similarly includes specification of the bit allocations and gains, and preferably also includes specification of the frequency domain equalizer coefficients ("FDQ") 45f, time domain equalizer coefficients ("TDQ") 45g, and echo canceller coefficients ("EC") 45h, among others.

Collectively, the parameters: bit allocation, gain, frequency domain coefficient, time domain coefficient, etc. form a parameter set, each of whose members are also sets, e.g. the bit allocation set defining the allocation of bits to each of the subchannels, the gain setting set defining the gains across the subchannels, etc. In accordance with the preferred embodiments of the present invention, the primary channel control table stores a single parameter set which has at least one member, i.e., a bit allocation set, and preferably a gain allocation set as well; this parameter set defines the default communications conditions to which the system will revert in the absence of disturbance events. The secondary channel control table, however, has at least two, and typically more, parameter sets for controlling transmission and reception over the subscriber lines by the respective modems; these sets define communications under various disturbance events which change the default conditions.

In particular, in FIG. 5B, the secondary channel control table 47 comprises a plurality of parameter sets 47a, 47b, 47c, etc., of which only three sets are shown for purposes of illustration. Each parameter set includes a transmit portion 47d and a receive portion 47e. In each portion, one or more parameters are specified, e.g., bit allocations 47f and gains 47g in the transmit portion 47d, and frequency domain coefficients 47h, time domain coefficients 47i, and echo cancellation coefficients 47j in the receive portion 47e. The actual values of the coefficients are typically complex numbers and thus they are represented simply by letters, e.g., "a", "b", etc. in the channel control tables of FIGS. 5A and 5B. Parameter sets 47b, 47c, and the remaining parameter sets are similarly constructed. As was the case for the primary channel control table, each parameter (e.g., bit allocation) is itself a set of elements that define communication conditions, at least in part, across the subchannels to which they apply and which they help characterize.

The primary channel control table containing a bit allocation parameter set is generated in the usual manner, i.e., during initialization (typically, a period preceding the transmission of "working data" as opposed to test data), known data is transmitted to, and received from, the remote modem with which the instant modem is in communication under the conditions which are to comprise the default condition for the modem. Typically, this will be with all disturbing devices inactivated, so that the highest data rate can be achieved, but the actual conditions will be selected by the user. The data received at each modem is checked against the data known to have been transmitted and the primary channel control parameters such as bit allocation, subchannel gains, and the like are calculated accordingly. This table is thereafter used as long as the system remains undisturbed by disturbance events which disrupt communications over the line.

The secondary channel control table may be determined during initialization in the same manner as the primary table, but with devices that may cause disturbance events actuated in order to redetermine the channel control parameters required for communications under the new conditions.

These devices may be actuated one by one, and a secondary parameter control set determined for each and stored in the secondary channel control table; or they may be actuated in groups of two or more, and parameter sets determined accordingly; or various combinations of single and group actuations may be performed and the corresponding parameter sets determined. Secondary parameter sets may similarly be determined from actual measurements with interfering sources such as xDSL transmissions in a common binder with the modems in question, and the resultant sets stored in the secondary table.

Other methods of determination of the secondary table may be employed. For example, one or more secondary parameter sets may be derived from the primary table. Thus, the bit allocation on each subchannel in the secondary table may be taken as a percentage, fixed or varying across the subchannels, of the bit allocation for each subchannel defined in the primary table. Alternatively, it may be calculated from the same data as that of the primary table, but using a larger margin; by using a percentage, fixed or varying across the subchannels, of the signal-to-noise ratio used in calculating the primary table; by providing for a different bit error rate than provided for in the primary; or by other techniques, including those described earlier. Portions of the primary and secondary may be recalculated or improved upon during the communication session, and stored for subsequent use. The calculation or recalculation may be a one-time event or may occur repeatedly, including periodically, throughout a communication session.

Figures 5C, 9A, 9B, 10:
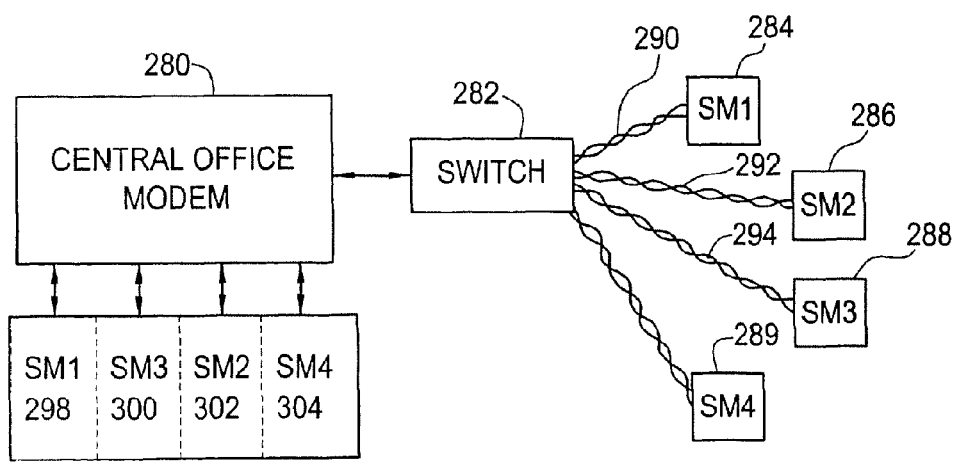

Further, although use of a multiplicity of parameter sets in the secondary channel control table will generally provide the best match to the actual channel conditions and thus more nearly approach optimum communications conditions, a simplified second table containing a single composite parameter set may also be used. Thus FIG. 5C shows a number of sets 45*a*-49*d* of bit allocations for the subchannels 49*e* and which may represent a corresponding number of different communication devices or conditions associated with communications over these subchannels. A single composite parameter set 49*f* may be formed as a function of the parameter sets 49*a*-49*d* by, for example, selecting, for each subchannel, the minimum bit allocation among the sets 49*a*-49*d* for each of the subchannels 49*e*. Such a set represents a "worst case" condition for activation of any of the devices associated with the sets 49*a*-49*d*. Other worst case parameter sets may be formed, for example, on selected groups of devices, thus providing for the case when several devices or disturbances are operating simultaneously.

In the absence of a disturbance event, the transceivers 26', 34' use the primary channel control tables 41, 45 for communications. Responsive to detection of a disturbance event, however, the transceivers 26', 34' switch to one of the parameter sets of the secondary channel control tables 43, 47 to continue the communications under the conditions specified by the particular parameter table. These conditions may specify a diminished bit rate while maintaining the same bit rate as is provided with the primary channel control table; or may specify the same bit error rate but at a higher bit error rate; or may specify a diminished bit rate at a correspondingly diminished power level or margin; or other conditions as determined by the specific channel control tables. On termination of the disturbance condition which caused the switch, the transceivers 26', 34' return to use of the primary tables 41, 45.

Typically, the primary tables provide communications at or near the capacity of the communications channel over line 14. The secondary tables provide communications over the channel at a diminished rate. Switching between the primary and secondary tables (that is, switching from a primary parameter set to a secondary parameter set) in accordance with the present invention is fast: it can be accomplished in an interval as short as several frames (each frame being approximately 250 microseconds in current ADSL systems), and thus avoids the lengthy delay (e.g., on the order of several seconds) that would otherwise be required for determination, communication over the subscriber line, and switching of newly-determined bit allocation tables. Further, it avoids communication of such tables over the subscriber line at a time when communications have been impaired and error rates are therefore high. Thus, utilization of prestored parameter sets in accordance with the present invention minimizes disruption to the communication process occasioned by disturbance events.

The channel control tables are stored in a storage or memory for rapid access and retrieval. Preferably, the storage is a random access memory ("RAM") incorporated into the modem itself, but also comprise such a memory located in other components accessible to the modem, e.g., in a stand-alone memory; in a computer such as a personal computer ("PC"); in a disk drive; or in other elements. Further, the storage may include portions of other forms of memory, such as read only memory ("ROM").

In addition to accessing the channel control tables 45 and 47, the control module 54 of FIG. 4 preferably also controls formulation of the secondary control table when this table is calculated on the basis of the primary channel control table. Further, the module 54 monitors the SNR on the subscriber line 14 and calculates the primary and secondary channel control parameter sets when these sets are based on measurement of actual conditions of the line, as will most commonly be the case. To this end, the control module is advantageously implemented as a special purpose digital computer or "DSP" chip particularized to the functions described herein. It may, of course, alternatively be implemented as a general purpose computer or in other fashion, as will be understood by those skilled in the art.

In accordance with the present invention, disturbance events on the subscriber line are distinguished from transient events such as lightning impulses by mean of their consequences. In particular, a signaling event such as an off-hook signal or an on-hook signal typically causes sufficient disruption as to preclude further communications without reinitialization. The event is accompanied by an error code indication that persists throughout the disruption; a change in the amplitude and phase of the physical signal carrying the data or of a pilot tone; the application of a substantial voltage to the line; and other indicia. We monitor the subscriber line for the occurrence of one or more of these characteristics in order to detect the event.

Figure 6:
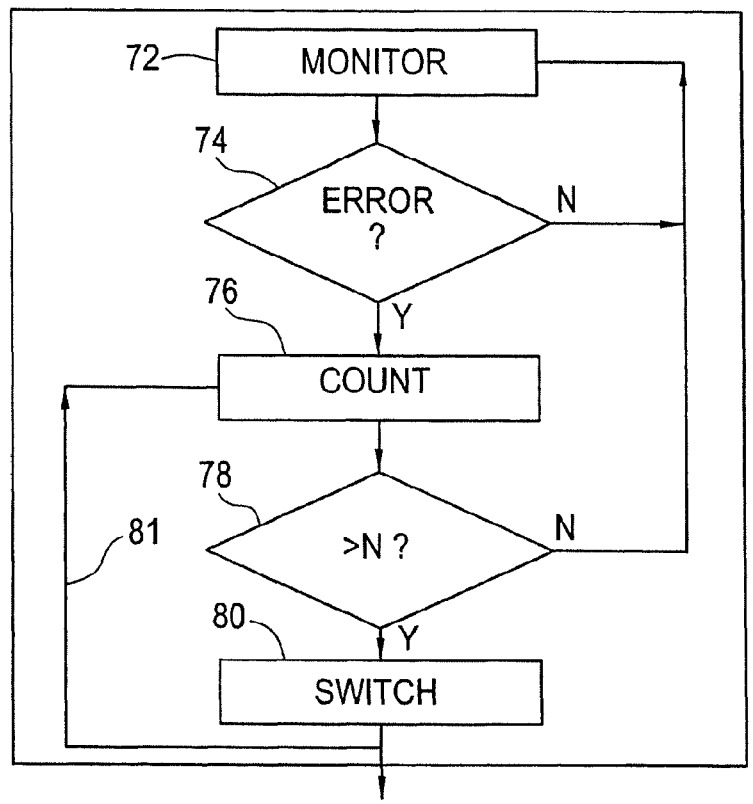
FIG. 6 is a diagram of one form of disturbance event detector in accordance with the present invention.

FIG. 6 illustrates one manner of detecting a disturbance event in accordance with the present invention. A detector 70, which is preferably included in control module 54, receives signals from line 14 and monitors (step 72) the error code (e.g., CRC errors or the FEC error count) associated with the signals for occurrence of an error indication. If no error is detected (step 74), the detector remains in monitoring mode without further action. If an error is indicated by the error code, a counter is incremented (step 76) and the count is then compared with a predefined threshold (step 78). If the count does not exceed the threshold (step 78, ">N?"), the system remains in monitoring mode and continues to accumulate any detected errors. If the count exceeds the threshold (step 78, Y), the detector emits a "disturbance event" detection signal (step 80) which causes the transceiver in which the detector 70 is located to initiate the process of switching to the appropriate parameter set in the secondary table. The count is reset (line 81) when this occurs.

Figure 7:
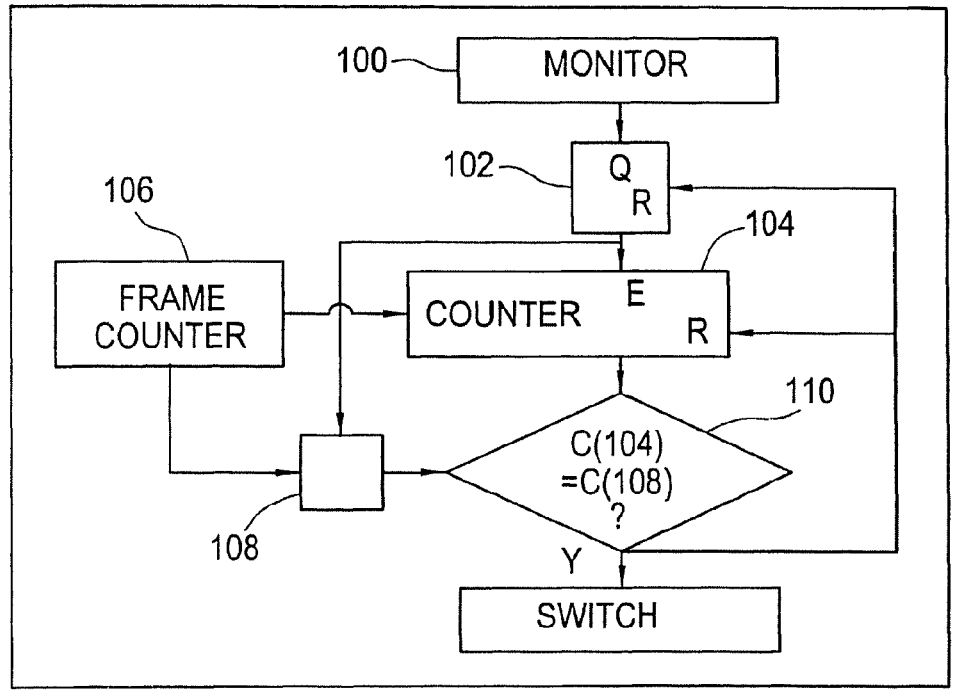
FIG. 7 illustrates the use of a frame counter for communicating the switching decision to the remote modem.

Instead of monitoring the error code for characteristic behavior (i.e., repeated error over successive frames), in accordance with the present invention one may monitor the amplitude and phase of the physical signals transmitting the data over the subchannel or of a pilot tone transmitted between modems. On the occurrence of a disturbance event, the amplitude and phase of the physical signal undergo significant change, i.e., the amplitude suddenly decreases and the phase suddenly shifts to a new value; thereafter, they maintain approximately their new values during successive frames. This behavior may be monitored as shown in FIG. 7 in which a monitor 100 monitors, for example, the amplitude of a data signal or a pilot tone on line 14 and sets a flip-flop 102 to an "active" state ("Q") on detecting a change in the amplitude of greater than a predefined threshold value. Flip-flop 102 enables (input "E") a counter 104 connected to receive counting pulses from a frame counter 106 whenever a new frame is transmitted or received by the modem. These counting pulses are also applied to a threshold counter 108 which accumulates the counts applied to it until it reaches a defined count and then applies the resultant count to a comparator 110 where it is compared with the count in counter 104. If the contents of the counters 104 and 108 are equal, comparator 110 provides an output ("Y") which causes the transceiver to initiate the process of switching to the appropriate table. This also resets the counters 104, 108 and the flip-flop 102. These are also reset (input "R") if the counts of counters 104 and 108 do not match ("N" output of comparator 110).

A similar procedure may be used to generate the table-switching signal based on monitoring the phase change of data signals or pilot tones as noted above. Further, although the operation of the event detector of FIG. 8 has been explained largely in terms of hardware, it will be understood that it may also readily be implemented in software, or in a combination of hardware and software, as is true of most of the elements described herein.

Still a further approach to detecting a disturbance event is to monitor the disturbance event directly. For example, in the case of off-hook or on-hook signals, a 48 volt dc step voltage is applied to the subscriber line. This signal is sufficiently distinct from other signals as to be readily detectable directly simply by monitoring the line for a step voltage of this size and thereafter generating a table-switching signal in response to its detection. Another approach is to monitor the SNR on one or more subchannels by monitoring the "sync" frames. The presence of a disturbance from data sources on adjacent phone lines manifests itself as a change in the subchannel SNR. A direct method of monitoring disturbance events caused by activation or deactivation of communication-disturbing devices is to directly signal between the device and the local modem on occurrence of either of these events. As shown in FIG. 3, for example, signaling lines 35, 37 may be extended directly between the local modem 34' and its associated devices 31, 32 to directly signal a change in these devices, such as their activation ("off-hook") or deactivation ("on-hook").

In addition to changing the control tables in response to a disturbance event, it is desirable to decrease the upstream transmit power level in order to minimize the interference with the voice communications caused by upstream transmissions, as well as to reduce the leakage of these transmissions into the downstream signal ("echo"). These interferences arise from nonlinearities caused by devices such as telephones that are coupled to the line, especially when the telephones are off-hook. The amount of power reduction required to render the interferences acceptable varies from one telephone to the next. In the preferred embodiment of the invention, a probing signal is used to determine the required decrease in upstream transmit power. In particular, after detecting a disturbance event such as activation or deactivation of a telephone or interference from other sources which can disrupt communications, the transmitter portion of the ATU-R (the "upstream transmitter") transmits a test signal over the subscriber line at varying power levels and measures the echo at the receiver portion of the ATU-R (the "downstream receiver"). The resultant measurement is used to determine an upstream transmission power level that minimizes echo at the downstream receiver or that at least renders it acceptable. The new power level, of course, is typically associated with a corresponding new parameter set in the channel control parameters.

In addition to changing the bit allocation and gain parameters in response to a disturbance event, it is generally necessary to change one or both of the subchannel equalizers, (i.e., the time-domain equalizers or the frequency-domain equalizers), as well as the echo canceller. Appropriate sets of these parameters may be formed in advance in the same manner as the bit allocations and channel gains (i.e., in a preliminary training session, sending test communications over the subscriber line with various devices connected to the line activated, measuring the resultant communication conditions, and determining the various parameters based on the measurements), and stored in the secondary channel control table for recall and use as required. Alternatively, they may be redetermined quickly during a retraining operation following detection of a disturbance event and without excessively disrupting communications, since these parameters are local to the receiver and thus need not be transmitted to the other modem in the communications pair.

In particular, in accordance with the preferred embodiment of the invention, on detecting a disturbance event, the transceivers enter a "fast retrain" phase, as shown in more detail in FIG. 8. A common disturbance event is taking a telephone off hook or replacing it on hook, and this is commonly detected at the ATU-R. The fast retrain process will be illustrated for such an event, although it will be understood that it is not limited to this, and that the retrain may be initiated for any type of disturbance event, and at either end of the communication. Thus, on detecting such an event (FIG. 8, event 200), the ATU-R notifies the ATU-C (step 202) to enter the fast retrain mode. The notification is preferably performed by transmitting a specific tone to the ATU-C, but may also comprise a message or other form of communication. On receiving this notification (step 204), the ATU-C awaits notification from the ATU-R of the power levels to be used for subsequent communications. This includes at least the upstream power level, an may include the downstream power level as well, since changing the upstream power level may impact downstream communications to some extent. For purposes of completeness, it will be assumed that both of these power levels are to be changed, although it will be understood that in many cases, only the upstream power level will be changed.

The new power levels to be used are determined by the ATU-R (step 208), which transmits a channel-probing test signal to the upstream transceiver and measures the resultant echo at the downstream receiver, it then sets the upstream power level to minimize the echo into the downstream signal, and may also set the downstream power level to minimize the effects of leakage of the upstream transmission into the downstream transmission at the upstream transmitter. The ATU-R then communicates (steps 210, 212) to the ATU-C the selected upstream and downstream transmission levels, e.g., by transmitting to the upstream transceiver one or more tones modulated by binary PSK (phase shift keying) signals to ensure robust communication of the power levels. The power levels may be specified directly (e.g., as "–30 dbm"), or indirectly (e.g., as "level 3" of a predefined group of levels), and the specification may identify the actual value of the power level, or simply the change in power level to be effectuated.

The ATU-R (step 214) and ATU-C (step 216) next commence transmission at the new power levels for purposes of retraining the equalizers and echo cancellers. Preferably, the change to the new power levels is synchronized through use of frame counters which are used in DSL systems to align transmitters and receivers, but the synchronization may be accomplished by other means (e.g., by transmitting a tone or message or by simply sending a flag) or may be left unsynchronized. Based on the training transmission, the ATU-R and ATU-C determine (steps 218, 220) the time and frequency domain equalizer parameters appropriate to the new power levels, as well as the appropriate echo canceller coefficients. The determination may include calculations based on these measurements in order to determine the coefficients, or the measurements may be used to select a particular set or sets of coefficients from one or more precalculated sets stored at the ATU-R and ATU-C, respectively.

For example, as was the case with determination of the power levels responsive to a disturbance event, the SNRs on various subchannels may be used to identify a particular device or devices associated with the event and thus to select an appropriate prestored parameter set stored at the ATU-R and ATU-C, respectively, simply by transmitting to the other modem in the communication pair a message or tone set that specifies the number of the parameter set to be used for subsequent communications. The SNR measurements thus serve as a "signature" of the device or devices associated with the disturbance event, and allow rapid identification of these devices. This approach can significantly reduce the time required to retrain the equalizers and echo cancellers. And even if training is required under particular circumstances, the training time can be meaningfully reduced by using prestored coefficients as the starting point.

To facilitate use of the SNR measurements in retrieving corresponding parameter sets, it is desirable that the various parameter sets as stored be indexed to sets of SNRs, so that one or more parameter sets associated with particular communication conditions may quickly be identified and retrieved. One way in which this may be accomplished is shown in FIG. 9A in which the respective parameter sets such as a first set 250, a second set 252, etc. have, in addition to the subchannel (SC) number 254 and the corresponding bit allocation (BA) and gain (G) entries, a SNR entry 260 characteristic of the parameter set appropriate to a given communication condition, such as "on-hook" (table 250), "off-hook" (table 252), etc. Additional parameter sets such as frequency domain equalizer coefficients, time domain equalizer coefficients, an echo cancellation coefficients may also be stored in the tables, as would be appropriate for the receiver portion of the modem; for the transmitter portion, these coefficients are not applicable and thus are not stored.

An alternative means of linking the subchannel SNRs and the corresponding parameter sets is shown in FIG. 9B. As there shown, a simple list structure 270 comprises a parameter set identifier 272, a multiplicity of SNR measures 274, 276, etc. SNRs for some or all of the subchannels may be included. The list may be searched measure for measure to identify the nearest match to a stored parameter set, and that set then retrieved for subsequent use. In either FIG. 9A or 9B the parameter set indexed to the SNRs may be a set of multiple parameters, such as bit allocations and gains, among others, of may comprise a single set such bit allocations only, or gains, only, etc.

The identification of the channel control parameter sets to be used for the subsequent communications is exchanged between the transceivers (steps 226-232) which then switch to these parameter sets (234, 236) and commence communications under the new conditions. The message containing the channel control parameters is preferably modulated in a similar manner as the "power level" message, i.e., using several modulating tones with BPSK signaling. The message is therefore short and very robust. It is important that it be short so that the fast retrain time is minimized, since the modem is not transmitting or receiving data during this time and its temporary unavailability may thus be very noticeable, as would be the case, for example, when the modem is being used for video transmission, or internet access, etc. Similarly, it is important that the message transmission be robust, since error-free communication during a disturbance event is very difficult, due to decreased SNR, impulse noise from ringing or dialing, or the like. Thus, the provision and utilization of the pre-stored parameter sets significantly enhances the reliability of communications despite the absence of a splitter at least one of the modems and despite the presence of disturbance events concurrent with data communications.

It is expected that the modems described herein will most commonly be used in dedicated pairs, i.e., each subscriber (ATU-R) modem will communicate with a dedicated central office (ATU-C) modem. However, in certain cases it may suffice to provide a single master central office modem to service two or more subscriber modems. The present invention accommodates that eventuality as well. Thus, in FIG. 10, a central office modem 280 communicates through a switch 282 with a plurality of subscriber modems 284, 286, 288 over subscriber lines 290, 292, 294. The modems may be located at differing distances from the central office and in different communication environments, and thus the channel control tables of each may be unique among themselves. Accordingly, the central office modem stores a master set 296 of individual channel control parameter sets 298, 300, 302, etc., one set (both transmit and receive) for each subscriber modem. On initiating communications to a particular subscriber, the central office modem retrieves the appropriate transmission parameter set for the subscriber and uses it in the subsequent communications. Similarly, on initiating communications to the central office, a given subscriber modem identifies itself to enable the central office modem to retrieve the appropriate reception parameter set for that subscriber.

CONCLUSION

From the foregoing it will be seen that we have provided an improved communications system for communication over subchannels of limited bandwidth such as ordinary residential telephone lines. The system accommodates both voice and data communications over the lines simultaneously, an eliminates the need for the installation and use of "splitters", an expense that might otherwise inhibit the adoption and use of the high communication capacity offered by DSL systems. Thus, it may be implemented and used as widely as conventional modems are today, but offers significantly greater bandwidth than is currently attainable with such modems.

What is claimed is:

1. A method of communication over a channel in a multicarrier modulation communications environment, the method comprising:
   detecting a disturbance event on the channel;
   determining a duration of the disturbance event;
   identifying the disturbance event as a continuing disturbance event based on at least the determined duration of the disturbance event; and
   in response to said identifying of the disturbance event as a continuing disturbance event, switching from a primary communication parameter set associated with the channel to a secondary communication parameter set associated with the channel;
   wherein the disturbance event is based on a detection of a Cyclic Redundancy Check (CRC) failure and is determined to be a continuing disturbance event if the CRC failure continues over a threshold number of communication frames transmitted over the channel.

2. The method of claim 1, wherein the disturbance event is an on-hook or off-hook event associated with voice communications.

3. The method of claim 1, wherein the primary communication parameter set includes at least a primary specification of bit allocations for the channel, and wherein the secondary communication parameter set includes at least a secondary specification of bit allocations for the channel.

4. The method of claim 1, wherein the primary communication parameter set includes at least a primary gain setting for the channel, and wherein the secondary communication parameter set includes at least a secondary gain setting for the channel.

5. An apparatus configured to communicate over a channel in a multicarrier modulation communications environment, the apparatus comprising:
   a control module coupled with a communication line and configured to receive signals from the communication line and to detect a Cyclic Redundancy Check (CRC) failure;
   a transmitter coupled to the control module and configured to transmit signals from the apparatus;
   a receiver coupled to the control module and configured to receive signals into the apparatus; and
   a primary channel control table and a secondary channel control table;
   wherein said control module is further configured to, upon detecting a continuing disturbance event on the channel, switch from the primary channel control table to the secondary channel control table for communication over the channel, wherein a disturbance event is determined to be the continuing disturbance event if the CRC failure continues over a threshold number of communication frames transmitted over the channel.

6. The apparatus of claim 5, wherein the primary channel control table includes at least a primary specification of bit allocations for the channel, and wherein the secondary channel control table includes at least a secondary specification of bit allocations for the channel.

7. The apparatus of claim 5, wherein the primary channel control table includes at least a primary gain setting for the channel, and wherein the secondary channel control table includes at least a secondary gain setting for the channel.

* * * * *

UNITED STATES PATENT AND TRADEMARK OFFICE
CERTIFICATE OF CORRECTION

PATENT NO. : 8,031,619 B2  
APPLICATION NO. : 12/555642  
DATED : October 4, 2011  
INVENTOR(S) : Tzannes et al.

It is certified that error appears in the above-identified patent and that said Letters Patent is hereby corrected as shown below:

Title page, item (73), under "Assignee", in Column 1, Line 1, delete "Daphimo Co.," and insert -- Daphimo Co. --.

Title page, item (60), under "Related U.S. Application Data", in Column 1, Line 1, delete "Continuation" and insert -- Division --.

Title page, item (56), under "Other Publications", in Column 2, Line 2, delete "Adaption," IEE" and insert -- Adaptation," IEEE --.

Signed and Sealed this  
Tenth Day of April, 2012

David J. Kappos  
*Director of the United States Patent and Trademark Office*